United States Patent [19]

Kraemer

[11] 4,226,560
[45] Oct. 7, 1980

[54] TOOLHOLDER ANVIL SEAT FOR INDEXABLE INSERTS

[75] Inventor: Rolf H. Kraemer, Gurnee, Ill.
[73] Assignee: Fansteel Inc., North Chicago, Ill.
[21] Appl. No.: 973,135
[22] Filed: Dec. 26, 1978
[51] Int. Cl.³ .............................................. B26D 1/12
[52] U.S. Cl. .................................................... 407/101
[58] Field of Search ............................ 407/46, 99, 101

[56] References Cited
U.S. PATENT DOCUMENTS

| | | | |
|---|---|---|---|
| 3,104,452 | 9/1963 | Greenleaf | 407/101 |
| 3,141,228 | 7/1964 | Bader et al. | 407/101 |
| 3,371,397 | 5/1968 | Coleshill et al. | 407/46 |
| 3,500,523 | 3/1970 | Cashman et al. | 407/101 |
| 3,577,618 | 4/1971 | Cashman | 407/101 |
| 4,066,376 | 1/1978 | Eckle et al. | 407/101 |
| 4,165,947 | 8/1979 | Smids | 407/101 |

*Primary Examiner*—Harrison L. Hinson
*Attorney, Agent, or Firm*—Barnes, Kisselle, Raisch & Choate

[57] ABSTRACT

A toolholder comprising a body having a segmental shaped recess at one end in which is secured a correspondingly shaped carrier or insert anvil provided with a tool bit accommodating pocket in which an indexable tool bit is adapted to be received, the carrier having a cylindrical depending portion received in a corresponding circular recess in the toolholder to positively locate the carrier when clamped in the recess with a headed screw or top clamp.

1 Claim, 5 Drawing Figures

TOOLHOLDER ANVIL SEAT FOR INDEXABLE INSERTS

FIELD OF INVENTION

Toolholders used primarily for turning and boring tools which have a corner recess for receiving an insert pocket anvil which in turn receives and retains an indexable insert.

BACKGROUND OF THE INVENTION

It is known in the art of toolholders to provide elongate toolholder bodies which carry some kind of a cutting material at a corner so that the device may be used as a turning tool.

Some of the earliest tools in this regard had cutting inserts of high speed steel and later carbide which are brazed into a pocket on the toolholder. These tools are still available from tool companies. Subsequently, the so-called throaway indexable inserts were developed with various means of clamping them in a recess on a tool so that they could be indexed and inverted to provide, for example, six cutting corners in a triangular insert as distinguished from a single cutting corner on a brazed insert.

Because of the need of smaller shops for a variety of tools, there has developed a type of tool called a replaceable anvil or removable pocket which can be fastened in a recess on a toolholder to receive and retain a cutting insert usually of the indexable type. For smaller shops, these tools can be used with a number of different anvil seats having square, triangular and circular recesses as well as parallelogram recesses for receiving respective inserts to perform different jobs. Thus, a single toolholder can be adapted to a number of different cutting programs by selecting the desired insert recess. Examples of this general type of pocket recess tool are found in the patents to Cashman and Wasco, U.S. Pat. No. 3,500,523, issued Mar. 17, 1970, and Eckle and Stahl, U.S. Pat. No. 4,066,376, issued Jan. 3, 1978.

OBJECTS OF THE PRESENT INVENTION

The present invention contemplates an improvement on the devices generally described in these patents and used in the art.

It is an object of the present invention to provide an anvil seat which is accurately located on a toolholder and secured in such a way that it cannot deviate from its position when clamped. Because of the inserts that are carried by the pocket anvil and the need for indexing, it is essential that the tools be such that the indexed corner will have the same position relative to the toolholder that the previous corner had.

It is thus an object to provide a special locator on the base of the anvil seat which precisely locates the anvil in the toolholder or boring bar.

A further object is to provide a toolholder or boring bar which can be readily prepared for the seat of the anvil without complicated anvils and configurations.

It is a further object to provide a structure which is stronger and sturdier in construction to provide a longer use and permit heavier cuts than might otherwise be possible.

Other objects and features of the invention will be apparent in the following description and claims in which the principles of the invention are set forth, together with details which will enable a person skilled in the art to practice the invention, all in connection with the best mode presently contemplated for the practice of the invention.

DESCRIPTION OF THE DRAWINGS

DRAWINGS accompany the disclosure and the various views thereof may be briefly described as.

With reference to the drawings.

Figure 1:
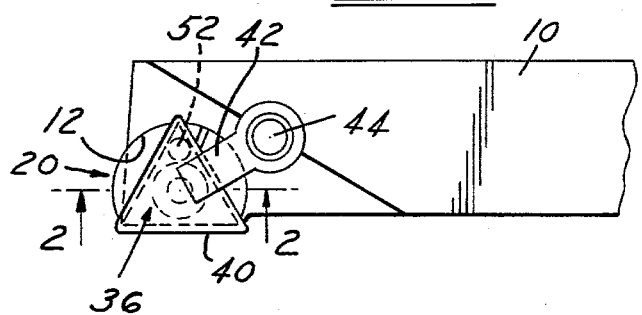
FIG. 1, a top view of a construction in accordance with the present invention.
Figure 2:
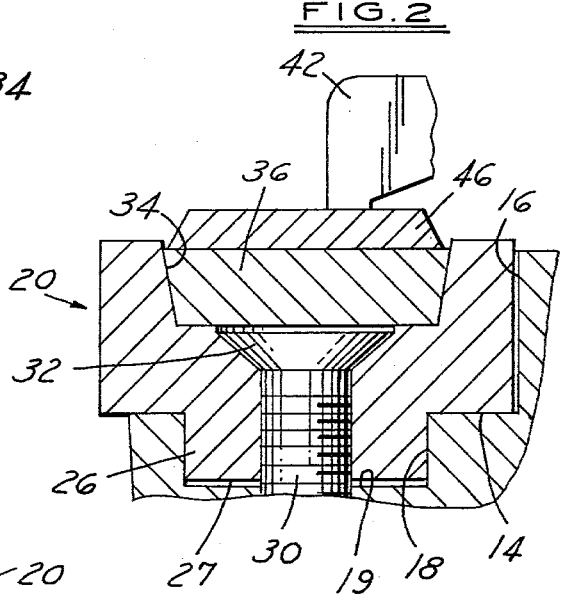
FIG. 2, a sectional view on line 2—2 of FIG. 1.
Figure 4:
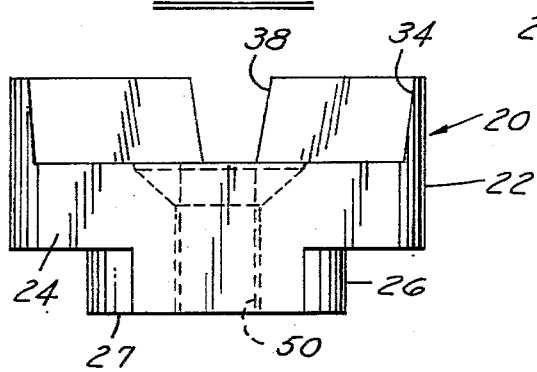
FIG. 4, a side view of the pocket anvil.

A toolholder in the form of an elongate bar 10 is illustrated in FIG. 1. This is generally known as a turning tool although it will be appreciated that the concept can be used equally well on a boring bar or other tools where indexable inserts are utilized. In the embodiment shown, a forward corner of the tool 10 has a recess 12 which can be a segment of a circle as illustrated, for example, or may have other desired polygonal configurations and has a flat base 14 as shown in FIG. 2 with a circular wall 16 which is perpendicular to the base 14. In the flat base 14, a well 18 is drilled and reamed, and terminated at bottom 19. A pocket anvil 20 is provided to be received and interfit with the recesses 16-18 in the toolholder 10. This anvil has circular walls 22 which are complemental to the wall 16 and the anvil has a chordal face 24. While a recess 12 has been shown, the pocket anvil of this invention may rest on any suitable supporting surface and project into a well in that surface. Also depending on the particular accuracy and load requirements, the walls of the recess 12 may have a snug fit with the periphery of the insert 20 or have a clearance fit.

The anvil also has a depending circular projection 26 which interfits into the well 18. This projection is accurately dimensioned in conjunction with well 18 and serves to locate positively the pocket anvil in conjunction with the walls of the well 18. The projection extends to end 27, which has a clearance with bottom 19 of the well 18. A screw 30 has a tapered head 32 which is received in a counterbore opening in the pocket anvil to retain the anvil securely on the toolholder 10.

Figure 5:
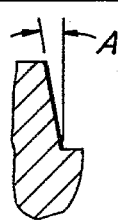
FIG. 5, a partial section on line 5—5 of FIG. 3.

A top insert recess 34 has converging walls to receive a triangular insert 36, these walls being open at 38 to allow clearance for the rear corner of the insert 36. The walls of the insert recess are also tapered with an angle such as shown at A in FIG. 5 to accommodate what are known as positive inserts with angled side walls. Straight sided recesses for negative inserts may also be provided.

It will be noted that the entire face edge 40 of the insert 36 is exposed so that the leading corner and the outside edge can be utilized in the cutting operation. While the particular pocket anvil 20 and the insert 36 are shown with a triangular shape, substitute anvils may also be utilized for square inserts, round inserts and other shapes as desired. This enables a single toolholder to carry any number of different shapes by changing the pocket anvil. The insert 36 may be retained in the pocket anvil in a number of ways which are common in the art. One possible retainer is an overhanging clamp 42 which is retained in the body 10 by a differential screw 44 so that the clamp may be raised and lowered at will. The clamp may also be used to retain a chip breaker 46 as shown in FIG. 2.

Figure 3:
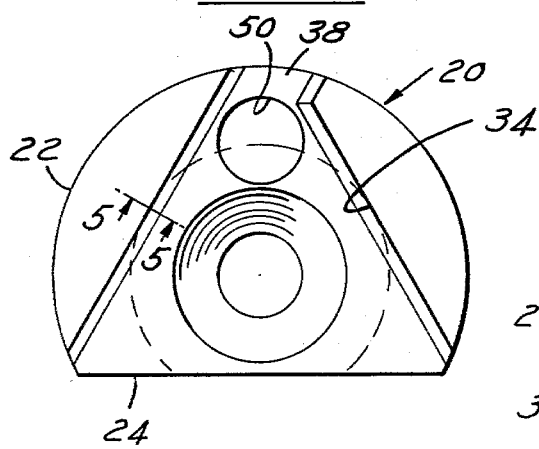
FIG. 3, an enlarged view of a pocket anvil utilized for a triangular insert.

It will be noted that the pocket anvil shown in FIG. 3 has an opening 50 parallel to the axis of the insert where the walls of the insert recess converge. This opening passes through the pocket anvil and is used for the reception of a pin 52 seated in a suitable opening in the toolholder 10. This pin will additionally locate the pocket anvil in conjunction with the projection 26 and the screw 30. The pin also orients the toolholder for a particular lead angle. Other means including a radial projection on the anvil interfitting with the side recess in the pocket 12 can be used to orient the anvil.

The combination of the cylindrical bottom projection 26 on an axis parallel to and spaced from aligned pin 52 provides an accurate and secure positioning of the anvil locator and thus accurate placement and replacement of the parts.

I claim:

1. In a toolholder combination for use with pellet type, polygonally shaped, throwaway cutting inserts which includes a removable anvil seat secured to the holder body having a recess to receive a cutting insert, that improvement which comprises:
    (a) a circular pocket having a first diameter formed in said toolholder body and having a flat base surface and straight enclosing walls parallel to the axis of the pocket and a concentric circular well having a diameter less than said first diameter formed in said base surface within the walls of said pocket below said base surface,
    (b) an anvil seat disposed on said toolholder having an insert recess in the top thereof and having first circular outer walls complemental to and interfitting with said enclosing walls of said circular pocket, an annular base surface to seat on said flat base surface of said pocket, and a circular depending projecting below said annular base surface to insert into and interfit into said well to positively and selectively locate said seat on said toolholder at a desired lead angle,
    (c) means to locate the desired orientation of said anvil seat in said well, and
    (d) means to locate and retain said anvil seat in the desired orientation on said toolholder in conjunction with said last named means to maintain the desired orientation of said anvil seat comprising a screw on an axis concentric with that of said circular pocket having a head countersunk into the bottom of said insert recess and a threaded shank extending into said toolholder body through said circular depending projection.

* * * * *

UNITED STATES PATENT AND TRADEMARK OFFICE
CERTIFICATE OF CORRECTION

PATENT NO. : 4,226,560
DATED : October 7, 1980
INVENTOR(S) : Rolf H. Kraemer

It is certified that error appears in the above—identified patent and that said Letters Patent are hereby corrected as shown below:

Claim 1 (Col. 4, Line 11), change "projecting" to "projection".

Signed and Sealed this

Third Day of February 1981

[SEAL]

Attest:

RENE D. TEGTMEYER

Attesting Officer     Acting Commissioner of Patents and Trademarks